Feb. 10, 1925.

A. F. GILLET

BRAKE BAND

Filed April 5, 1924

1,526,277

Inventor

Alexis F. Gillet

Hiram A. Sturges
Attorney

Patented Feb. 10, 1925.

1,526,277

UNITED STATES PATENT OFFICE.

ALEXIS F. GILLET, OF OMAHA, NEBRASKA, ASSIGNOR TO JUBILEE MANUFACTURING COMPANY, OF OMAHA, NEBRASKA, A CORPORATION.

BRAKE BAND.

Application filed April 5, 1924. Serial No. 704,409.

*To all whom it may concern:*

Be it known that I, ALEXIS F. GILLET, a citizen of the United States, residing at Omaha, in the county of Douglas and State of Nebraska, have invented certain new and useful Improvements in Brake Bands, of which the following is a specification.

This invention relates to brake-bands for the brake-drums used to control the movements or speed of motor vehicles and particularly for use in instances where the drums and brake-bands are exposed to the oil in the crank-cases of automobiles, and has for its object, broadly, to prevent the yielding fiber lining from becoming hard and unduly worn and to facilitate a control of a vehicle in its movements, one feature to attain these objects being to provide such a construction for the band that, when pressure is applied it will tend to form numerous soft portions or cushions at the edges and between the edges of the lining, tending to absorb oil to advantage, said cushions to be disposed at uniform longitudinal intervals of said lining.

Another object is to provide passageways in the band for a movement of oil to the lining and particularly to permit oil to move freely for reaching the medial line of the lining and parts outwardly thereof at uniform longitudinal intervals, said passageways or oil ducts to open upon the parts of the lining sustaining the greatest pressure. The invention also includes projections for the brake-band which enter into the yielding lining and which operate as conduits for the oil, and includes projections having flat contact-faces for resisting pressure when the brake-band is contracted, to prevent the projections from penetrating the lining, and tending to permit a flow of oil through the oil ducts into said lining.

With the foregoing objects in view the invention presents a novel and useful construction, combination and arrangement of parts as described herein and illustrated in the accompanying drawings and as claimed, it being understood that changes in size, form, proportion and minor details may be made as found to be of advantage, said changes to be determined by the scope of the invention as claimed.

Figure 1:
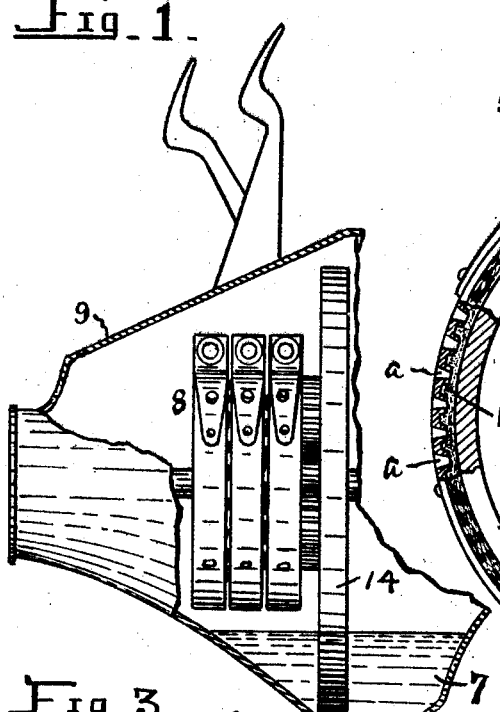
Figure 2:
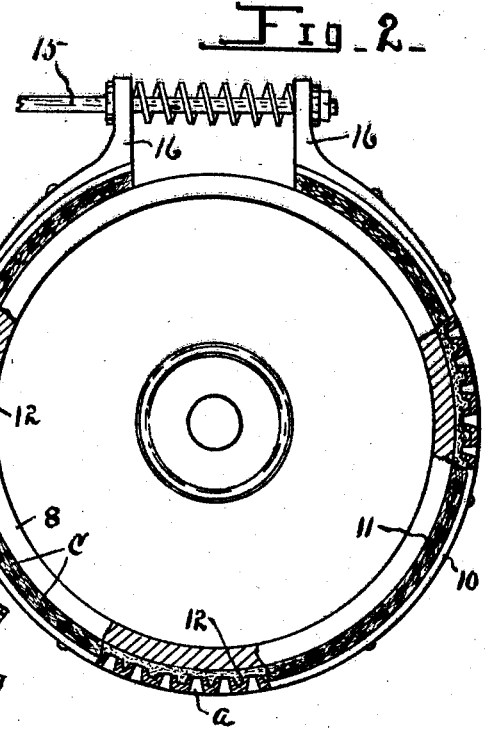
Figures 3, 4:
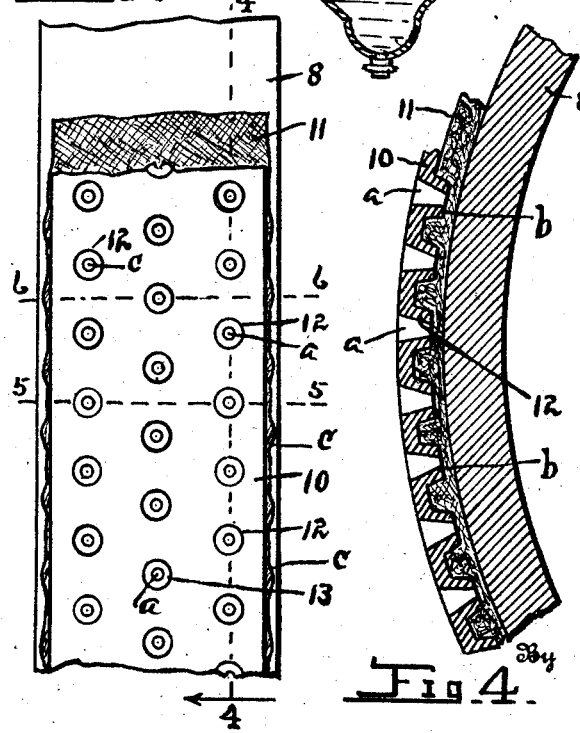
Figures 5, 6:
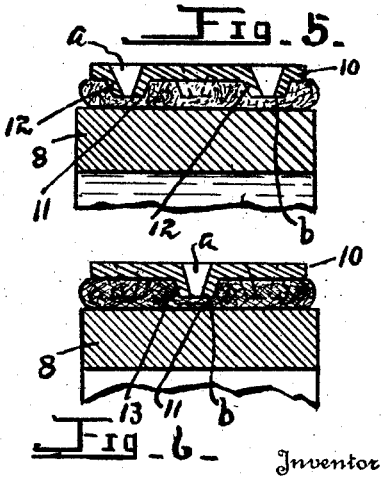

In the drawings Fig. 1 is a side view, partly in section, showing a part of a crank case and transmission cover of an automobile to illustrate the proximity of oil to the brake-drums and brake-bands, these parts shown being in general use. Fig. 2 is a side view, partly in section, of one of the drums shown in Fig. 1, the brake-band, however, being constructed in accordance with the present invention. Fig. 3 is a side view showing a part of the brake band, its lining and a part of a brake-drum. Fig. 4 is a longitudinal section on line 4—4 of Fig. 3. Fig. 5 is a transverse section on line 5—5 of Fig. 3. Fig. 6 is a transverse section on line 6—6 of Fig. 3.

Referring now to the drawing for a more particular description, the invention is shown and described in connection with a crank case 7 which contains a supply of oil, and brake-drums 8 suitably mounted for rotation in the transmission cover 9 of an automobile.

Numeral 10 indicates a brake-band which illustrates one embodiment of the invention, a yielding lining 11 generally constructed of a knitted fabric being employed and secured to its inner side; and, as is well known, during use and when pressed against the drum by a brake-band of ordinary construction, said lining becomes worn and frequently requires replacement. Also it is well known that, regardless of the fact that this lining is exposed to the presence of oil in the crank-case, the oil entering the lining will, for the most part, be removed by pressure, and said lining soon becomes indurate when overlaid and pressed by a brake-band of ordinary construction, the result in use, when the oil is practically excluded, being that the rugose inner surface of the lining will disappear and will become hard, the degree of hardness for the linings in such instances operating to destroy the yielding effects which it would otherwise provide, and the lining then soon as worn that replacement by a new lining will be required.

In order that oil may be absorbed by practically all parts of the lining, the brake-band is provided on its inner side with projections 12 adjacent to its opposed edges and with similar projections 13 at its medial line disposed in staggered relation with respect to the projections 12, all of these projections being apertured as indicated at *a* and each having a flat terminal bearing-face *b* (Figs. 4, 5, 6,) for engaging and urging the lining toward the drum when pressed into said lining, the result being that portions of the lining beneath the projections will receive a high degree of pressure which may be exposed to oil from the apertures *a*, and that parts between the projections 12 will receive a lesser degree of pressure when the brake-band is compressed, and will remain as comparatively soft portions or cushions *c* (Fig. 3) for absorbing oil to advantage, the result being that the lining will not become unduly worn, and that a suitable control for the brake-drums may be attained.

It is well known that rotation of the fly-wheel 14 operates to move oil to the drums and brake-bands, and is depended upon for lubricating the linings of the bands. According to the present construction it will be seen that the oil may enter the lining at the sides of the brake-band and particularly may enter the cushions *c*; also it may enter the apertures or oil ducts *a* in the projections 12 and 13 to be absorbed by those parts of the lining which are subjected to a greater pressure.

It will be appreciated, on account of the present construction, that pressure of the band 10 will not cause oil to exude from the lining to any considerable extent since it will be retained in those parts of said lining between the projections, said projections tending to permit the lining therebetween to lie loosely upon the brake-drum; and while it is true that those parts of the lining which are disposed immediately between the projections and drum will receive a great pressure, oil may enter to those parts through the ducts *a*, and the flat surfaces *b* of the projections tend to prevent the projections from penetrating the lining.

It will be understood that a shaft 15 has bearings in the plates 16 at the terminals of a brake-band, and that when the shaft is rotated, said rotation or part rotation will cause contraction of the band for pressing the lining against the drum.

I claim as my invention,—

1. In a brake-band for a drum, said brake-band having a yielding lining for engaging the drum, a band adapted to be contracted and provided with apertured projections for conducting oil to and causing compression of parts of the lining at longitudinal intervals inwardly of its edges when contracted and for causing a lesser compression of the lining at its edges when said band is contracted.

2. In a brake-band for a drum, said brake-band having a yielding lining for engaging the drum, a band adapted to be contracted and provided with apertured projections at longitudinal intervals for conducting oil and causing compression of parts of the lining at its medial line when contracted, and having apertured projections at longitudinal intervals for conducting oil and causing compression of parts of the lining adjacent to its opposed edges when contracted, and coincidently therewith for causing a lesser degree of compression of the lining at its opposed edges and a lesser degree of compression of said lining adjacent to its medial line.

3. In a brake-band for a drum, said brake-band having a yielding lining for engaging the drum, a band adapted to be contracted and having projections at longitudinal intervals inwardly of its opposed edges for engaging the lining, and having apertures extending from its outer side through the projections to conduct oil to said lining.

4. In a brake-band for a drum, said brake-band having a yielding lining for engaging the drum, a band adapted to be contracted and provided at longitudinal intervals adjacent to its edges with inwardly extending projections to cause the parts of the lining between the projections and drum to be subjected to a high degree of pressure and to cause parts at the medial line of said lining to be subjected to a lesser degree of pressure when said band is contracted.

In testimony whereof I have affixed my signature in presence of two witnesses.

ALEXIS F. GILLET.

Witnesses:
HIRAM A. STURGES,
ARTHUR H. STURGES.